Patented Oct. 21, 1930

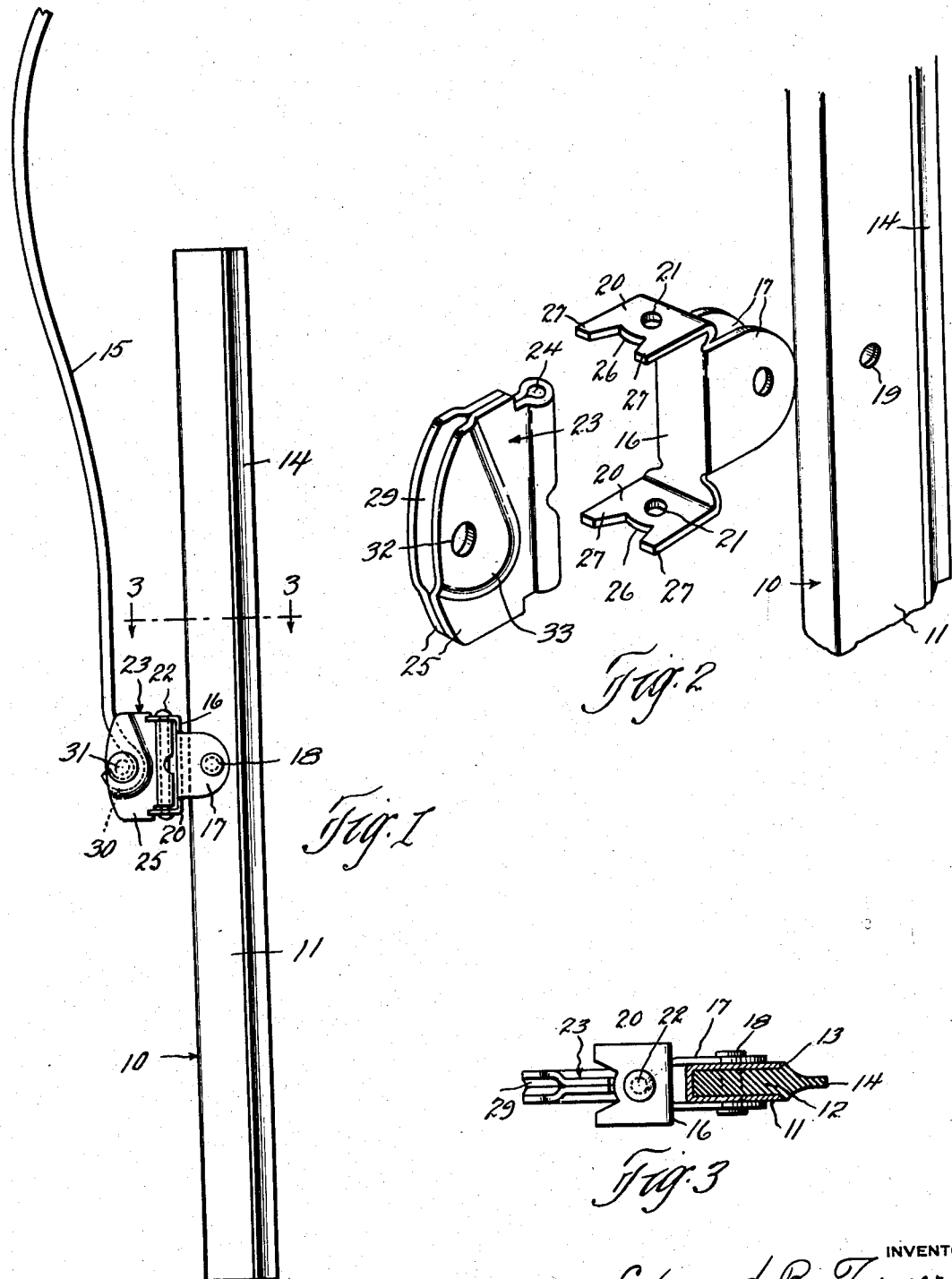

1,779,344

UNITED STATES PATENT OFFICE

EDWARD B. TARVER, OF LAKEWOOD, OHIO, ASSIGNOR TO THE MEDINA RUBBER COMPANY, OF MEDINA, OHIO, A CORPORATION OF OHIO

WINDSHIELD WIPER

Application filed April 6, 1929. Serial No. 352,954.

This invention relates generally to windshield cleaners and more particularly to means for mounting the wiper and securing the same to the operating arm.

The object of the invention is to provide a simple and effective connection between the operating arm and the wiping member which will permit the wiper to have the proper rocking or turning action upon the windshield in order to present the proper wiping surface to the glass.

A further object is to provide a connection particularly adapted to engage a resilient wire operating arm provided with a hook at its end so that the same is readily detached from the arm when it is necessary to install a new rubber in the wiper.

With these various objects in view the invention consists in the novel features of construction and in the manner of combining and arranging the same all of which will be fully described hereinafter and particularly pointed out in the appended claims.

In the drawings forming part of this specification, Fig. 1 is a side elevation of my device; Fig. 2 is a perspective view of the hinge portion of my invention, the parts being in separated position; and Fig. 3 is a section on the line 3—3 of Fig. 1.

Inasmuch as my device is constructed for use with all types of windshield cleaners, either power or hand operated, it will not be necessary to describe the construction and operation of the operating mechanism. I will therefore describe in detail only those parts which constitute the essential features of my invention.

The wiper member designated generally by the reference numeral 10 comprises a sheet metal channel member 11 in which is molded a rubber wiper member 12. The wiper 12 is provided with laterally projecting shoulder portions 13 at opposite sides thereof engaging the opposite edges of the channel member 11, and a tapered portion 14 projecting beyond channel member 11 constituting the wiping portion of the device.

In the movement of the wiper 10 back and forth over the glass it is desirable to have it mounted in such a way that it is free to rock slightly from side to side so that the edge 14 is pulled over the glass in place of being pushed, or even held perpendicular to the glass as it moves to avoid unnecessary flexing of the edge 14. For this purpose I provide a two-piece coupling or hinge connection between the wiper member 10 and actuating arm 15. The one member 16 to which the wiper 10 is pivoted for limited movement is provided with two parallel apertured ears 17 extending from one side and between which the wiper 10 is pivoted by a pin 18 which passes through the aligned apertures in the ears 17 and an aperture 19 in the wiper. On its opposite side the member 16 is provided with a second set of spaced parallel ears 20 in planes at right angles to the ears 17, the ears 20 having apertures 21 which receive a pivot pin 22.

Pivoted to the pin 22 and between the ears 20 on the member 16 is a connecting member 23 formed from a single sheet of metal folded back on itself to provide a cylindrical bearing portion 24 through which the pivot pin 22 passes so that the member 23 may swing thereon, the outer side portions 25 of the connector 23 being slightly longer than the bearing portion 24 so that they extend over the ears 20.

Each ear 20 is formed at its outer end with a notch 26 to provide spaced lugs 27 between which the ends of the side members 25 of the member 23 may pivot, the lugs 27 limiting the rocking movement of the wiper 10 on the operating arm 15. The notches 26 may be made of varying angularity to permit greater or lesser rocking movement as desired.

At their outer ends the side portions 25 of the connecting member 23 are stamped to provide a curved bottom slot 29 between them, to receive the hooked end 30 of the operating arm 15. It will be noted that the depressed portions in the member 25 which form between them the slot 29 are so shaped as to provide a curved seat for the bight portion of the hook. A pin 31 received in aligned apertures 32 in the members 25 secures the hook in its seat.

To remove the connecting members from the operating arm 15 it is only necessary to rotate them about the hook 30 until the bight of the hook is disengaged from the seat portion 33 of the slot when it is then slid longitudinally of the arm 15, the pin thus slipping out of the hook 30.

The connection above described is extremely effective permitting the necessary movement of the wiper 10 relative to the arm, there being three pivotal points in two directions at right angles to each other.

The connection is simple and inexpensive to manufacture and is particularly suitable for supporting the wiper from a flexible operating arm having a hook at its attaching end.

Having thus described my invention, what I claim is:

1. In a windshield cleaner, a wiper member and an actuating arm therefor, means connecting said wiper and actuating arm, said means including a member having parallel ears, a connecting member having parallel arms joined along one edge by a member forming a hub rotatably received between said ears, the arms being separated at their outer portions to provide a seat therebetween, the actuating arm having a hook at its end received in said seat, and a bolt extending through said arms and through said hook.

2. In a windshield cleaner, a wiper member and an actuating arm therefor, means for connecting said wiper and actuating arm, said means including a first member secured to said wiper and having spaced parallel ears, a second connecting member received between said ears and pivoted for limited rotational movement thereto, said second connecting member having parallel arm portions provided with opposed depressions forming between them a round bottom groove opening at their outer ends, said actuating arm having a hook at its outer end received in said groove and a pin passing through said arms about which said hook engages.

3. In a windshield cleaner, a wiper member and an actuating arm therefor, means for connecting said wiper and actuating arm, said means including a first member secured to said wiper and having spaced parallel ears, a second connecting member received between said ears and pivoted for limited rotational movement thereto, said second member having a round bottom groove in its outer end, a hook on said actuating arm received in said groove and a pin passing through said second member and said groove on which said hook engages to prevent separation of the parts when in operative positions.

4. In a windshield cleaner, a wiper member and an actuating arm therefor, means for connecting said wiper and actuating arm, said means including a first member secured to said wiper and having spaced parallel ears, a second connecting member received between said ears and pivoted for limited rotational movement thereto, said second connecting member having parallel arm portions provided with opposed depressions forming between them a round bottom groove opening at their outer ends, said actuating arm having a hook at its outer end received in said groove and a pin passing through said arms about which said hook engages, said hook being removable from said pin in one position of said second member when the parts are rotated relative to each other out of their operative positions.

5. In a windshield cleaner, a wiper member and an actuating arm therefor, means for connecting said wiper and actuating arm, said means including a first member secured to said wiper and having spaced parallel ears, a second connecting member received between said ears and pivoted for limited rotational movement thereto, said second member comprising a single strip of metal doubled back on itself providing at the closed end a cylindrical bearing, a pin passing through said bearing and the above mentioned ears on which said second member pivots, the free ends of said second member being spaced apart, a hook portion on the end of said actuating member received between said arms, and a pin passing through said arm and hook portion for holding the parts together.

In testimony whereof, I hereunto affix my signature.

EDWARD B. TARVER.